US010168675B2

(12) United States Patent
Hashimoto et al.

(10) Patent No.: US 10,168,675 B2
(45) Date of Patent: Jan. 1, 2019

(54) INDUSTRIAL MACHINE MANAGEMENT SYSTEM, INDUSTRIAL MACHINE MANAGEMENT DEVICE, INDUSTRIAL MACHINE MANAGEMENT METHOD, AND INFORMATION STORAGE MEDIUM

(71) Applicant: Kabushiki Kaisha Yaskawa Denki, Kitakyushu-shi, Fukuoka (JP)

(72) Inventors: Ayaka Hashimoto, Kitakyushu (JP); Tadashi Okubo, Kitakyushu (JP); Jiro Muraoka, Kitakyushu (JP)

(73) Assignee: Kabushiki Kaisha Yaskawa Denki, Kitakyushu-shi (JP)

( * ) Notice: Subject to any disclaimer, the term of this patent is extended or adjusted under 35 U.S.C. 154(b) by 535 days.

(21) Appl. No.: 14/526,545

(22) Filed: Oct. 29, 2014

(65) Prior Publication Data

US 2015/0120010 A1    Apr. 30, 2015

(30) Foreign Application Priority Data

Oct. 29, 2013    (JP) .................................. 2013-224358

(51) Int. Cl.
*G05B 15/02* (2006.01)
*H04L 29/08* (2006.01)
(Continued)

(52) U.S. Cl.
CPC ......... *G05B 15/02* (2013.01); *G05B 19/0426* (2013.01); *G05B 19/41855* (2013.01);
(Continued)

(58) Field of Classification Search
None
See application file for complete search history.

(56) References Cited

U.S. PATENT DOCUMENTS

2004/0268298 A1* 12/2004 Miller ...................... G06F 8/60
717/106
2011/0087726 A1    4/2011 Shim et al.
(Continued)

FOREIGN PATENT DOCUMENTS

CN    102523297 A    6/2012
EP    2019347 A1    1/2009
(Continued)

OTHER PUBLICATIONS

Office Action of Jul. 5, 2016, for corresponding JP application No. 2013-224358 and Partial Translation thereof.
(Continued)

*Primary Examiner* — Mohammad Ali
*Assistant Examiner* — Saad M Kabir
(74) *Attorney, Agent, or Firm* — HEA Law PLLC

(57) ABSTRACT

An industrial machine management system includes a maintenance-use portable terminal and a cloud server. The maintenance-use portable terminal includes a data communication unit for transmitting management information for a user, which is set in accordance with an input from the user in regard to an industrial machine to be managed. The cloud server includes a data communication unit for receiving the management information for the user transmitted by the data communication unit, and a machine information storage for storing the management information for the user received by the data communication unit in association with individual identification information on the industrial machine to be managed.

9 Claims, 12 Drawing Sheets

(51) Int. Cl.
  *G05B 19/042* (2006.01)
  *G05B 19/418* (2006.01)
  *H04L 12/24* (2006.01)

(52) U.S. Cl.
  CPC ...... *H04L 41/0803* (2013.01); *H04L 41/0856* (2013.01); *H04L 41/24* (2013.01); *H04L 67/10* (2013.01); *G05B 2219/31391* (2013.01); *H04L 41/28* (2013.01); *Y02P 90/10* (2015.11); *Y02P 90/185* (2015.11)

(56) References Cited

U.S. PATENT DOCUMENTS

| | | |
|---|---|---|
| 2011/0225640 A1 | 9/2011 | Ganapathy et al. |
| 2013/0082827 A1 | 4/2013 | Cho et al. |
| 2014/0351148 A1 | 11/2014 | Yoshikawa et al. |

FOREIGN PATENT DOCUMENTS

| | | |
|---|---|---|
| EP | 2224295 A1 | 9/2010 |
| JP | 2008-234318 A | 10/2008 |
| JP | 2011-147254 A | 7/2011 |
| JP | 2013-074133 A | 4/2013 |
| WO | 2013/145203 A1 | 8/2015 |

OTHER PUBLICATIONS

Office Action dated Nov. 15, 2016, JP Patent Application No. 2013-224358 and Partial translation thereof.
European Search Report for 14190582.8 dated Apr. 20, 2015.

\* cited by examiner

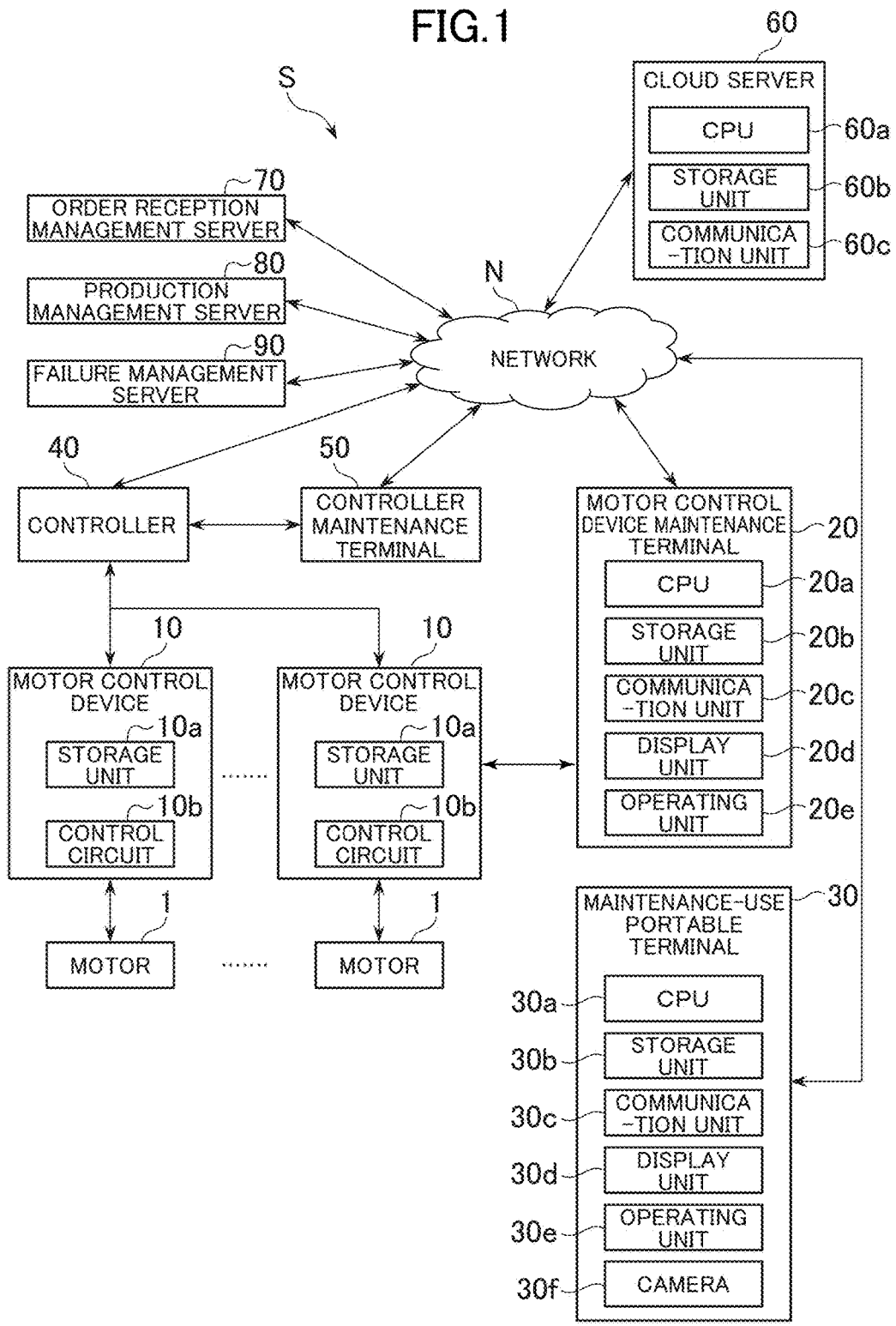

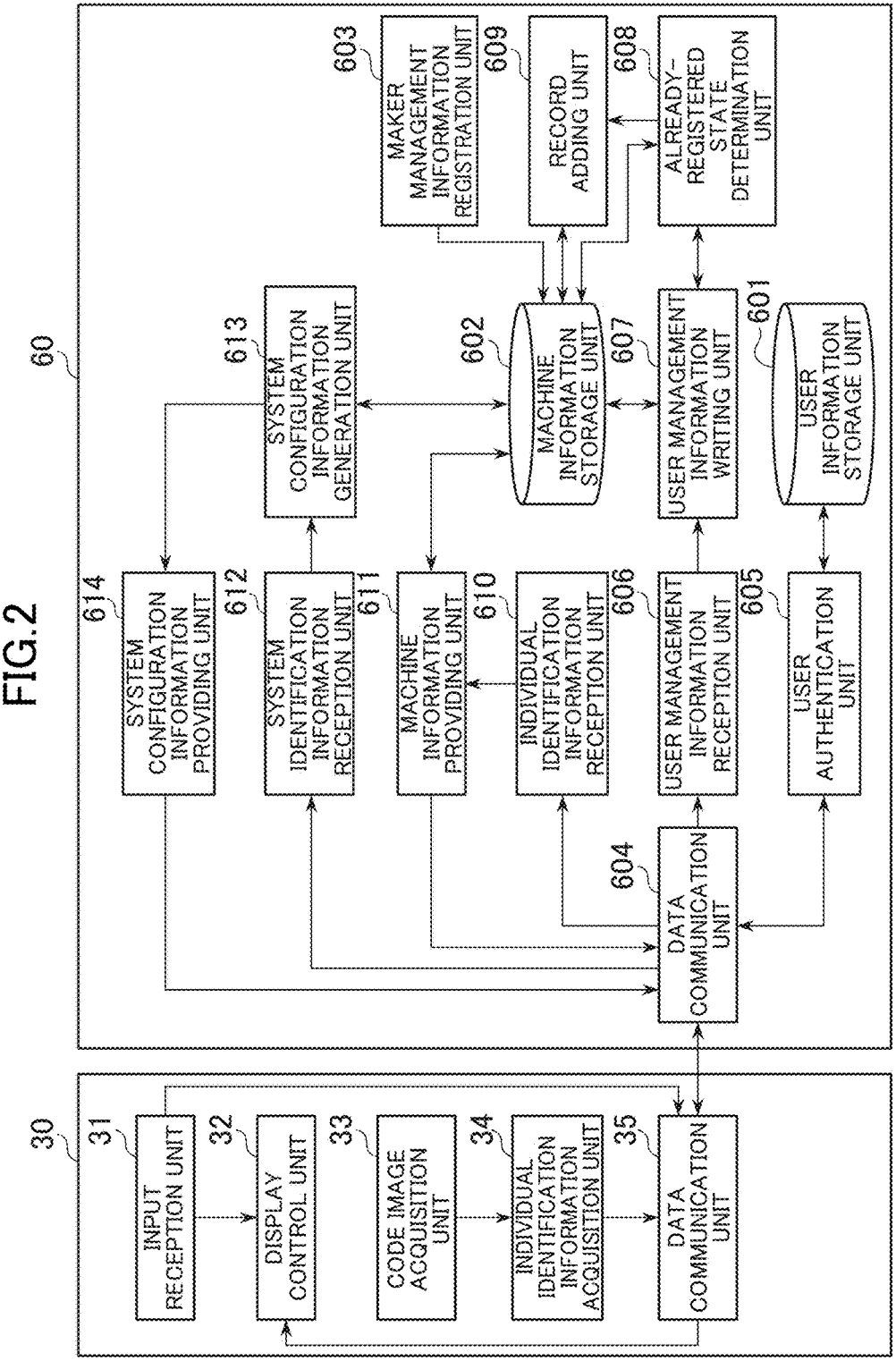

FIG.3

| SERIAL NUMBER | OWNER | MAKER AREA ||||| USER AREA |||||
|---|---|---|---|---|---|---|---|---|---|---|---|
| | | PRODUCT NAME | MODEL | PRODUCT DESCRIPTIONS | MANUFAC-TURING DATE | ... | FACILITY NAME | DEVICE NAME | PURPOSE | CONNECTION DESTINATION | ... |
| 10001 | U0001 | A | X1 | A 100V 100W | 10.10.2013 | ... | X | Y | ... | CONNECTION DESTINATION (CHILD) 20001 20002 A91001 | ... |
| 20001 | U0001 | B | Y1 | B 100V 100W | 10.11.2013 | ... | X | Y | ... | CONNECTION DESTINATION (PARENT) 10001 | CONNECTION DESTINATION (CHILD) 30001 ... |
| 20002 | U0001 | B | Y1 | B 100V 100W | 10.11.2013 | ... | X | Y | ... | CONNECTION DESTINATION (PARENT) 10001 | CONNECTION DESTINATION (CHILD) 30002 ... |
| 30001 | U0001 | C | Z1 | C 100V 100W | 10.12.2013 | ... | X | Y | ... | CONNECTION DESTINATION (PARENT) 20001 | PROFILE PARAMETER SET A ... |
| 30003 | U0001 | C | Z1 | C 100V 100W | 10.12.2013 | ... | X | Y | ... | CONNECTION DESTINATION (PARENT) 20002 | PROFILE PARAMETER SET A ... |

FIG.4

| SERIAL NUMBER | OWNER | USER AREA | | | | | | | |
|---|---|---|---|---|---|---|---|---|---|
| | | PRODUCT NAME | MODEL | PRODUCT DESCRIPTIONS | FIRMWARE | FACILITY NAME | DEVICE NAME | PURPOSE | CONNECTION DESTINATION (PARENT) | CONNECTION DESTINATION (CHILD) | ... |
| A91001 | U0001 | α | D100 | ... | ... | X | Y | ... | 10001 | X13002 | ... |
| X13002 | U0001 | β | D200 | ... | ... | X | Y | ... | A91001 | | ... |

FIG.9

| | | |
|---|---|---|
| SERIAL NUMBER : | 20001 | ←—511 |

510

512 { MAKER MANAGEMENT INFORMATION

| PRODUCT NAME | B |
|---|---|
| MODEL | Y1 |
| PRODUCT DESCRIPTIONS | B 100V 100W |
| MANUFACTURING DATE | 10.11.2013 |
| MANUFACTURING PLACE | ..... |

513 { USER MANAGEMENT INFORMATION

| FACILITY NAME | X |
|---|---|
| DEVICE NAME | Y |
| PURPOSE | ..... |
| CONNECTION DESTINATION (PARENT) | 10001 |
| PROFILE | PARAMETER SET A |

DISPLAY SYSTEM (DEVICE) CONFIGURATION INFORMATION INCLUDING THIS MACHINE — 515

EDIT — 514

FIG.11

SYSTEM CONFIGURATION INFORMATION

| SERIAL NUMBER | PRODUCT NAME | MODEL | FACILITY NAME | DEVICE NAME | CONNECTION DESTINATION (PARENT) | CONNECTION DESTINATION (CHILD) |
|---|---|---|---|---|---|---|
| 10001 | A | X1 | X | Y | 10001 | 20001 20002 A91001 |
| 20001 | B | Y1 | X | Y | 10001 | 30001 |
| 20002 | B | Y1 | X | Y | 20001 | 30002 |
| 30001 | C | Z1 | X | Y | 20002 | |
| 30002 | C | Z1 | X | Y | 10001 | |
| A91001 | α | D100 | X | Y | 30001 | X13002 |
| X13002 | β | D200 | X | Y | A91001 | |

[DISPLAY WIRING DIAGRAM]

Wiring Diagram of Industrial Machine

INDUSTRIAL MACHINE MANAGEMENT SYSTEM, INDUSTRIAL MACHINE MANAGEMENT DEVICE, INDUSTRIAL MACHINE MANAGEMENT METHOD, AND INFORMATION STORAGE MEDIUM

CROSS-REFERENCE TO RELATED APPLICATIONS

The present disclosure contains subject matter related to that disclosed in Japanese Priority Patent Application JP 2013-224358 filed in the Japan Patent Office on Oct. 29, 2013, the entire contents of which are hereby incorporated by reference.

BACKGROUND OF THE INVENTION

Field of the Invention

The present invention relates to an industrial machine management system, an industrial machine management device, an industrial machine management method, a program, and an information storage medium.

Description of the Related Art

For example, in the invention disclosed in Japanese Patent Application Laid-open No. 2011-147254, in regard to an industrial machine including a motor or a control device therefor, model information and manufacturing information on the industrial machine are stored and output. On the other hand, in general, a system configuration obtained by combining a plurality of industrial machines differs depending on a facility, and a user needs to manage data on settings of individual industrial machines and the like by himself/herself. In this manner, when the user manages information on the industrial machine individually, setting information and the like on the industrial machine may not be shared smoothly.

SUMMARY OF THE INVENTION

According to one aspect of the present invention, there is provided an industrial machine management system, including: a terminal; and an industrial machine management device, in which: the terminal includes a transmission unit for transmitting management information for a user, which is set in accordance with an input from the user in regard to an industrial machine to be managed; and the industrial machine management device includes: a reception unit for receiving the management information for the user transmitted from the transmission unit; and a storage unit for storing the management information for the user received by the reception unit in association with individual identification information on the industrial machine to be managed.

According to one aspect of the present invention, there is provided an industrial machine management device, including: an acquisition unit for acquiring management information for a user, which is set in accordance with an input from the user in regard to an industrial machine to be managed; and a storage control unit for storing the management information for the user acquired by the acquisition unit in a storage unit in association with individual identification information on the industrial machine to be managed.

According to one aspect of the present invention, there is provided an industrial machine management method performed by an industrial machine management device, the industrial machine management method including: acquiring management information for a user, which is set in accordance with an input from the user in regard to an industrial machine to be managed; and storing the acquired management information for the user in a storage unit in association with individual identification information on the industrial machine to be managed.

According to one aspect of the present invention, there is provided an information storage medium having stored thereon a program for causing a computer to: acquire management information for a user, which is set in accordance with an input from the user in regard to an industrial machine to be managed; and store the acquired management information for the user in a storage unit in association with individual identification information on the industrial machine to be managed.

BRIEF DESCRIPTION OF THE DRAWINGS

FIG. 1 is a diagram illustrating an example of an overall configuration of an industrial machine management system according to an embodiment of the present invention.

FIG. 2 is a diagram illustrating an example of functions provided to a maintenance-use portable terminal and a cloud server.

FIG. 3 is a table showing an example of a machine information database on an industrial machine made by a predetermined maker.

FIG. 4 is a table showing an example of a machine information database on an industrial machine made by a maker other than the predetermined maker.

FIG. 9 is a diagram illustrating an example of a display screen for the industrial machine information.

FIG. 11 is a diagram illustrating an example of a display screen for the configuration information on the industrial machine system.

DESCRIPTION OF THE EMBODIMENTS

Figure 5:
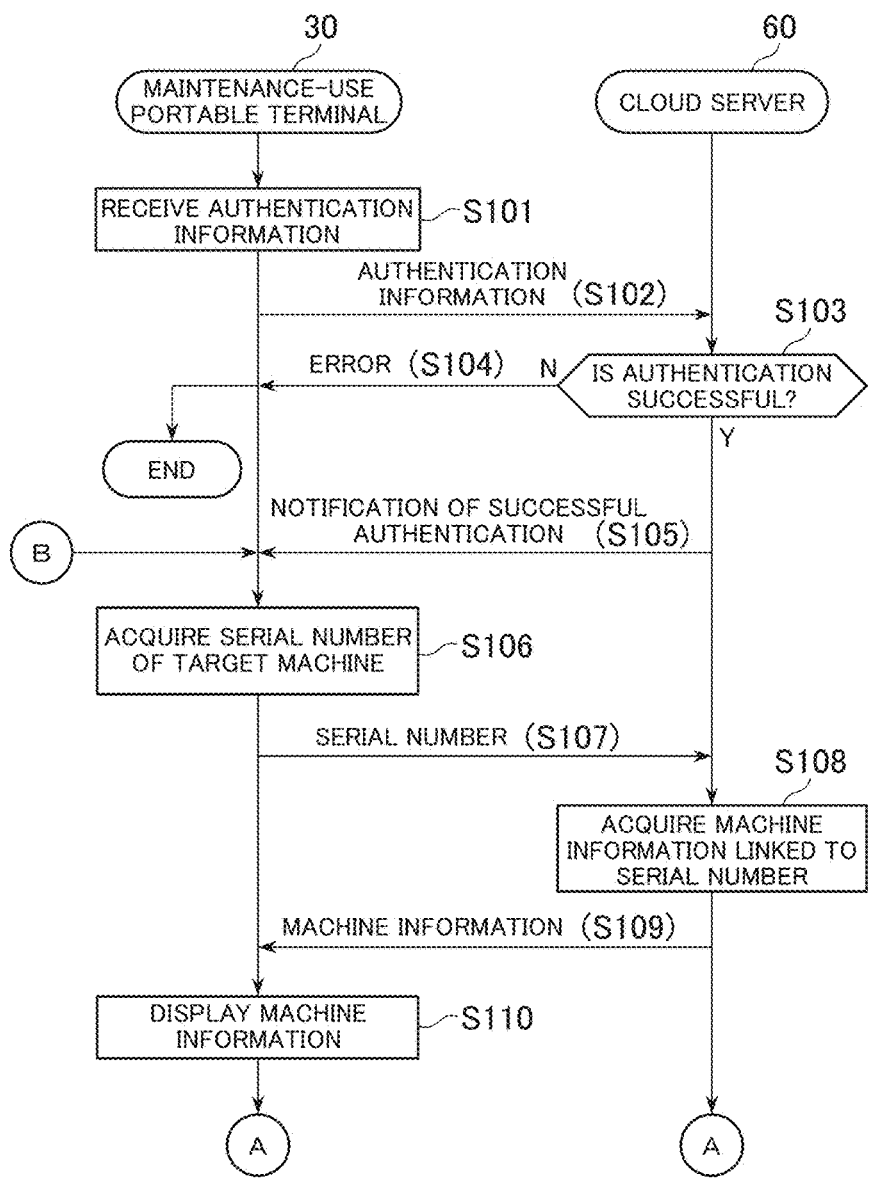
FIG. 5 is a sequence diagram illustrating an example of processing for providing industrial machine information to a user.

Now, an embodiment of the present invention (hereinafter referred to as "the embodiment") is described in detail with reference to the accompanying drawings.

[Industrial Machine Management System According to the Embodiment of the Present Invention]

FIG. 1 is a diagram illustrating an example of an overall configuration of an industrial machine management system S according to the embodiment of the present invention. As illustrated in FIG. 1, the industrial machine management system S includes a plurality of motors 1, a plurality of motor control devices 10, a motor control device maintenance terminal 20, a maintenance-use portable terminal 30, a controller 40, a controller maintenance terminal 50, a cloud server 60, an order reception management server 70, a production management server 80, and a failure management server 90. The motor control device maintenance terminal 20, the maintenance-use portable terminal 30, the controller 40, the controller maintenance terminal 50, the cloud server 60, the order reception management server 70, the production management server 80, and the failure management server 90 are connected to one another through a network N so as to be able to transmit/receive data to/from one another. Note that, in this embodiment, the cloud server 60 functions as an industrial machine management device. Further, a case where the industrial machine management system S includes devices other than the cloud server 60 and the terminals (such as motor control device maintenance terminal 20 and maintenance-use portable terminal 30) used by a user is described as an example, but the configuration of the industrial machine management system S is not limited the example described in this embodiment.

This embodiment is described by taking an exemplary case where the user who uses an industrial machine (such as motor, motor control device, or controller) uses the industrial machine management system S. For example, the respective motors 1, the respective motor control devices 10, the motor control device maintenance terminal 20, the maintenance-use portable terminal 30, the controller 40, and the controller maintenance terminal 50 are possessed and managed by the user. Further, the cloud server 60, the order reception management server 70, the production management server 80, and the failure management server 90 may be managed by a maker.

Each of the motor control devices 10 is formed by integrating a servo amplifier and a control circuit, and operates in accordance with an instruction issued by the controller 40. A storage unit 10a of each of the motor control devices 10 includes a RAM and an EEPROM, and stores a parameter, firmware, and the like for operating the motor control device 10. In this embodiment, a two-dimensional code including a serial number and public information on a customization ID described later is assigned to each of the motor control devices 10. Further, the storage unit 10a of the motor control device 10 may also store setting information (for example, parameter and firmware) adjusted by the user.

The motor control device maintenance terminal 20 is an information processing device such as a personal computer. The motor control device maintenance terminal 20 includes, for example, as hardware configurations, a CPU 20a, a storage unit 20b, a communication unit 20c, a display unit 20d, and an operating unit 20e. The storage unit 20b includes a RAM and a hard disk drive, and stores various programs and data. The CPU 20a executes various kinds of processing based on those programs and data. The communication unit 20c includes a network card and various communication connectors, and performs communications to/from another device. The display unit 20d is a liquid crystal display or the like, and displays various screens in accordance with an instruction issued by the CPU 20a. The operating unit 20e is an input device such as a mouse or a keyboard.

The motor control device maintenance terminal 20 can be connected to each of the motor control devices 10, and is used by the user to perform maintenance work. For example, the motor control device maintenance terminal 20 writes a parameter designated by the user into the storage unit 10a of each of the motor control devices 10. Further, the motor control device maintenance terminal 20 downloads firmware selected by the user from the cloud server 60 to be installed onto the storage unit 10a of each of the motor control devices 10, and updates the installed firmware. In addition, in this embodiment, the motor control device maintenance terminal 20 can also display various kinds of information registered in the cloud server 60 on the display unit 20d.

The maintenance-use portable terminal 30 is a portable information processing device such as a smartphone or a tablet terminal. The maintenance-use portable terminal 30 includes, for example, as hardware configurations, a CPU 30a, a storage unit 30b, a communication unit 30c, a display unit 30d, an operating unit 30e, and a camera 30f. The storage unit 30b includes a RAM, and stores various programs and data. The CPU 30a executes various kinds of processing based on those programs and data. The communication unit 30c includes a network card and various communication connectors, and performs communications to/from another device. The display unit 30d is a touch panel or the like, and displays various screens in accordance with an instruction issued by the CPU 30a. Further, the operating unit 30e may also be implemented by the touch panel.

The user can perform the same maintenance work as the motor control device maintenance terminal 20 by using the maintenance-use portable terminal 30. In this embodiment, the maintenance-use portable terminal 30 includes the camera 30f for photographing the two-dimensional code of the motor control device 10. The maintenance-use portable terminal 30 analyzes an image of the two-dimensional code photographed by the camera 30f, and identifies the serial number or the like of each of the motor control devices 10 (and the controller 40, the motor 1, and the like).

The controller 40 outputs an upper-level control instruction for controlling the motor 1 to each of the motor control devices 10, and centrally controls each of the motor control devices 10.

The controller maintenance terminal 50 is an information processing device such as a personal computer. The controller maintenance terminal 50 is connected to the controller 40, and is used by the user to perform maintenance work. For example, the controller maintenance terminal 50 creates a program to be executed by the controller 40 and a timing chart in accordance with the user's instruction, and displays the various kinds of information registered in the cloud server 60.

The cloud server 60 is a server computer for managing the various kinds of information used in the industrial machine management system S. The cloud server 60 includes, for example, as hardware configurations, a CPU 60a, a storage unit 60b, and a communication unit 60c. The hardware configurations of the CPU 60a, the storage unit 60b, and the communication unit 60c are the same as those of the CPU 20a, the storage unit 20b, and the communication unit 20c, and hence descriptions thereof are omitted. The cloud server 60 manages personal information on each user, information on devices, and the like, and provides those pieces of information in response to a request from outside.

The order reception management server 70 is a server computer for managing an order reception situation of the industrial machine from the user.

The production management server 80 is a server computer for managing a production situation of the industrial machine whose order has been received by the order reception management server 70.

The failure management server 90 is a server computer for managing a failure that has occurred in the industrial machine purchased by the user.

Note that, the program and each piece of data that are described as being stored in each device of the industrial machine management system S may be stored in an information storage medium connected to the each device, or may be acquired from an external device through the network N. Further, the hardware configurations of the respective devices are not limited to the above-mentioned example, and generally-used hardware can be employed. The same applies to the devices the detailed descriptions of the hardware configurations of which are omitted for the sake of simplicity in description.

Now, processing executed by the industrial machine management system S is described by taking exemplary scenes in which, in regard to the industrial machine such as the controller 40, the motor control device 10, or the motor 1 managed by the user, user management information set on the user side is registered in the cloud server 60, and the user management information registered in the cloud server 60 is acquired and used. Note that, the following description is directed to a case of using the maintenance-use portable terminal 30 as a terminal used by the user, but another user terminal such as the motor control device maintenance terminal 20 may be used as the terminal used by the user.

[Functions Implemented by the Industrial Machine Management System S According to the Embodiment of the Present Invention]

FIG. 2 is a functional block diagram illustrating functions implemented by a terminal (here, maintenance-use portable terminal 30) used by the user to register information on an industrial machine and the cloud server 60 of the industrial machine management system S. The functional block diagram illustrated in FIG. 2 is at least a part of the functions provided to the maintenance-use portable terminal 30 and the cloud server 60, and another function may be further provided to each of the devices.

[Functions Implemented by the Maintenance-Use Portable Terminal 30]

First, a description is made of the functions provided to the maintenance-use portable terminal 30. As illustrated in FIG. 2, the maintenance-use portable terminal 30 includes an input reception unit 31, a display control unit 32, a code image acquisition unit 33, an individual identification information acquisition unit 34, and a data communication unit 35. The functions of the respective units provided to the maintenance-use portable terminal 30 are implemented by the hardware (CPU 30a, storage unit 30b, communication unit 30c, display unit 30d, operating unit 30e, and camera 30f) provided to the maintenance-use portable terminal 30.

The input reception unit 31 receives an input from the user based on, for example, the user's operation performed by the user on the operating unit 30e. The input reception unit 31 may receive, from the user, individual identification information (serial number) on an industrial machine, designation of user setting information (for example, facility name, device name, file name containing a parameter, serial number of another industrial machine serving as a connection destination of the industrial machine) set for the industrial machine by the user, and a request for registration, viewing, or the like of the designated information. The input reception unit 31 outputs the information received from the user to the data communication unit 35, and transmits the information received from the user to the cloud server 60 by the data communication unit 35.

The display control unit 32 displays various screens such as a screen for displaying information on an industrial machine to be managed and a screen for registering the information on the industrial machine on the display unit 30d based on the information received by the input reception unit 31 and based on the information received by the data communication unit 35.

The code image acquisition unit 33 picks up an image of a code image formed, printed, or attached on the industrial machine (controller 40, motor control device 10, or motor 1) by the camera provided to the maintenance-use portable terminal 30, for example, to acquire the code image. Note that, in this embodiment, the individual identification information (serial number) on the industrial machine may be encoded in the code image.

The individual identification information acquisition unit 34 acquires the individual identification information (serial number) on the industrial machine to be processed. For example, the individual identification information acquisition unit 34 may acquire the individual identification information (serial number) on the industrial machine to be processed, based on the code image input from the code image acquisition unit 33 or the individual identification information designated by the user and input from the input reception unit 31. For example, when the code image is input from the code image acquisition unit 33, the individual identification information acquisition unit 34 may decode the input code image to acquire the individual identification information (serial number) encoded in the code image.

The data communication unit 35 transmits/receives data to/from a computer (for example, cloud server 60) to/from which the maintenance-use portable terminal 30 communicates. For example, the data communication unit 35 transmits the information received by the input reception unit 31 and the individual identification information acquired by the individual identification information acquisition unit 34 to the cloud server 60 in accordance with the user's operation received by the input reception unit 31, to request the cloud server 60 to perform processing, and receives a processing result from the cloud server 60 to visually output the received processing result by the display control unit 32.

[Functions Implemented by the Cloud Server 60]

Next, a description is made of the functions provided to the cloud server 60 according to this embodiment. As illustrated in FIG. 2, the cloud server 60 includes a user information storage unit 601, a machine information storage unit 602, a maker management information registration unit 603, a data communication unit 604, a user authentication unit 605, a user management information reception unit 606, a user management information writing unit 607, an already-registered state determination unit 608, a record adding unit 609, an individual identification information reception unit 610, a machine information providing unit 611, a system identification information reception unit 612, a system configuration information generation unit 613, and a system configuration information providing unit 614. The functions of the respective units provided to the cloud server 60 are implemented by the hardware (CPU 60a, storage unit 60b, and communication unit 60c) provided to the cloud server 60.

The user information storage unit 601 stores a user information database for storing various kinds of information on a user (including corporation). For example, the user information database stores a user ID for uniquely identifying the user, a password, and personal information (corporation information) on each user. When the user performs a predetermined user registration, a new record is created in the user information database, and the information input by the user who has performed the user registration is stored in the record. The information stored in the user information database may be changed in response to each user's request.

The machine information storage unit 602 stores a machine information database for storing various kinds of information on the industrial machine. In this embodiment, the machine information storage unit 602 stores a first machine information database for storing information on an industrial machine made by a predetermined maker whose production is managed by the production management server 80 and a second machine information database for managing information on an industrial machine made by a maker other than the predetermined maker. In the user's facility, not only an industrial machine made by a predetermined maker but also an industrial machine made by a maker other than the predetermined maker may coexist, and hence the second machine information database for managing the industrial machine made by the maker other than the predetermined maker is held in addition to the first machine information database for managing the information on the industrial machine made by the predetermined maker, to thereby allow the information on the user's industrial machine system to be centrally managed even in an environment in which industrial machines made by various makers coexist.

FIG. 3 is a table showing an example of the first machine information database. As shown in FIG. 3, the first machine information database stores a serial number serving as the individual identification information on the industrial machine made by the predetermined maker, an owner thereof, and management information thereon. Here, the management information includes a maker area serving as a storage area for storing maker management information managed by the maker and a user area serving as a storage area for storing the user management information managed by each user.

The maker area stores the maker management information (unique information on an industrial machine independent of a user's environment) managed by the maker for an industrial machine. For example, the maker management information includes a product name of the industrial machine, a model thereof, product descriptions relating to specifications, a manufacturing date, and a kind and version information on firmware. Note that, the kind and version information on the firmware within the maker area may be appropriately changed when the firmware is downloaded or updated. On the other hand, the information other than the kind and version information on the firmware may be invariable in principle. Further, when the industrial machine is purchased after being customized, the maker area may further store a customization ID for identifying details of the customization.

The user area stores the user management information managed by the user for the industrial machine. For example, the user management information may include at least one combination of an item and data on the item for each of the industrial machines. The items that can be set in the user management information may be freely set by the user, and at least one of, for example, "facility name", "device name", "purpose", "connection destination (parent) ", "connection destination (child)", "profile", or the like may be set as an initial item in advance. Note that, the "facility name" represents a name of a facility in which the industrial machine is placed. The "device name" represents a name of a device configured by combining a plurality of industrial machines. The "purpose" represents information describing a purpose of the industrial machine. The "connection destination (parent)" represents a parent industrial machine (for example, industrial machine on a side of managing the industrial machine) connected to the industrial machine (by wiring). The "connection destination (child)" represents a child industrial machine (for example, industrial machine managed by the industrial machine) connected to the industrial machine (by wiring). The "profile" represents data on a unique parameter set, which is set for the industrial machine.

A content of item and a number of the items stored in the user area may be changed in response to the user's request, and may differ between individual industrial machines.

FIG. 4 is a table showing an example of the second machine information database. As shown in FIG. 4, the second machine information database stores a serial number serving as the individual identification information on the industrial machine made by a maker other than the predetermined maker, an owner thereof, and management information thereon. In the second machine information database, the management information includes the user area serving as the storage area for storing the user management information managed by each user, but does not include the maker area unlike the first machine information database.

The information stored in the user area within the second machine information database may be set arbitrarily by the user. For example, in the user area, at least one of the items including the product name, the model, the product descriptions, the manufacturing date, the kind and version information on firmware, the facility name, the device name, the purpose, the connection destination (parent), the connection destination (child), and the profile may be set as an initial item in advance. Note that, also in the second machine information database, the user area may have the same feature as that of the first machine information database.

The maker management information registration unit 603 registers the maker management information on the industrial machine in the first machine information database. For example, when the industrial machine whose order has been placed by the user is produced, the maker management information registration unit 603 creates a new record in the first machine information database, and stores the serial number of the industrial machine, the owner thereof, and each piece of information included in the maker area. Note that, for example, the maker management information registration unit 603 may acquire those pieces of information from the production management server 80 to register the information.

The data communication unit 604 transmits/receives data to/from a computer (for example, the maintenance-use portable terminal 30) to/from which the cloud server 60 communicates. For example, based on the received data, the data communication unit 604 may sort and output the data to the user authentication unit 605, the user management information reception unit 606, the individual identification information reception unit 610, or the system identification information reception unit 612.

The user authentication unit 605 executes user authentication processing based on user authentication information received from the maintenance-use portable terminal 30 through the data communication unit 604. For example, when the user authentication information (user ID and password) is received by the data communication unit 604, the user authentication unit 605 may receive an input of the user authentication information from the data communication unit 604, and execute the user authentication processing based on whether or not the input user authentication information (user ID and password) matches the user ID and the password stored in the user information storage unit 601.

The user management information reception unit 606 receives the user management information from the maintenance-use portable terminal 30 through the data communication unit 604. For example, when the individual identification information (serial number) on the industrial machine and the user management information (information including the combination of the item and the data on the item) is received by the data communication unit 604, the user management information reception unit 606 may receive the inputs of the individual identification information (serial number) and the user management information from the data communication unit 604.

The user management information writing unit 607 writes the user management information received by the user management information reception unit 606 into the record corresponding to the individual identification information received by the user management information reception unit 606, based on the individual identification information (serial number) and the user management information received by the user management information reception unit 606. For example, the user management information writing unit 607 searches the machine information database (machine information database is assumed to be a database including both the first machine information database and the second machine information database) stored in the machine information storage unit 602 for the corresponding record with the serial number received by the user management information reception unit 606 as a key. The user management information writing unit 607 writes the user management information received by the user management information reception unit 606 into the user area of the above-mentioned retrieved record. In this case, when an item included in the user management information received by the user management information reception unit 606 already exists in the record corresponding to the serial number received by the user management information reception unit 606, the user management information writing unit 607 updates the information on the item that already exists. Further, when the item included in the user management information received by the user management information reception unit 606 does not exist, the user management information writing unit 607 may newly add the item, and then write the information into the added item.

In this embodiment, when the user management information received by the user management information reception unit 606 includes at least one of the item of the connection destination (parent) or the item of the connection destination (child), the user management information writing unit 607 outputs those items and the data (serial number) on the items to the already-registered state determination unit 608 along with the serial number received by the user management information reception unit 606.

When receiving the items (connection destination (parent) and connection destination (child)) and the data (serial number) on the items from the user management information writing unit 607, the already-registered state determination unit 608 determines whether or not the received serial number has already been registered in a serial number field of the machine information database stored in the machine information storage unit 602. When determining that the serial number received from the user management information writing unit 607 has not been registered in the serial number field of the machine information database, the already-registered state determination unit 608 outputs the items (connection destination (parent) and connection destination (child)) and the data (serial number; hereinafter referred to as "connection destination serial number") on the items received from the user management information writing unit 607 to the record adding unit 609 along with the serial number (hereinafter referred to as "connection source serial number") of the record to which the user management information is written by the user management information writing unit 607.

When receiving the inputs of the items (connection destination (parent) and connection destination (child)) and the data (connection destination serial number) on the items from the already-registered state determination unit 608 along with the input of the connection source serial number, the record adding unit 609 newly adds a record to the second machine information database. Then, the record adding unit 609 writes the received connection destination serial number into the serial number field of the added record. In addition, when the item input from the already-registered state determination unit 608 is the connection destination (parent), the record adding unit 609 adds the item of the connection destination (child) to the user area, and writes the connection source serial number as the data on the item of the connection destination (child). Further, when the item input from the already-registered state determination unit 608 is the connection destination (child), the record adding unit 609 adds the item of the connection destination (parent) to the user area, and writes the connection source serial number as the data on the item of the connection destination (parent).

The individual identification information reception unit 610 receives the individual identification information from the maintenance-use portable terminal 30 through the data communication unit 604. For example, when the individual identification information (serial number) is received by the data communication unit 604 along with a request for viewing of detailed information on the industrial machine, the individual identification information reception unit 610 may receive the individual identification information (serial number) from the data communication unit 604.

The machine information providing unit 611 provides the management information stored in association with the individual identification information (serial number) received by the individual identification information reception unit 610. For example, the machine information providing unit 611 searches the machine information database for the corresponding record with the serial number received by the individual identification information reception unit 610 as a key. The machine information providing unit 611 may provide the management information stored in the above-mentioned retrieved record to a source of the request for the viewing of the detailed information on the industrial machine through the data communication unit 604. Note that, the above-mentioned management information may be set as at least a part of the information stored in the maker area and the user area when the maker area exists, and may be set as at least a part of the information stored in the user area when the maker area does not exist.

The system identification information reception unit 612 receives industrial machine system identification information for identifying one industrial machine system formed of a plurality of industrial machines from the maintenance-use portable terminal 30 through the data communication unit 604. The industrial machine system identification information may be set as, for example, the individual identification information (serial number) on one industrial machine that forms the industrial machine system. For example, when the industrial machine system identification information is received by the data communication unit 604 along with a request for viewing of configuration information on the industrial machine system, the individual identification information reception unit 610 may receive the industrial machine system identification information from the data communication unit 604. The system identification information reception unit 612 outputs the received industrial machine system identification information to the system configuration information generation unit 613.

The system configuration information generation unit 613 generates system configuration information including the information on each of the plurality of industrial machines that form the industrial machine system based on the industrial machine system identification information input from the system identification information reception unit 612. For example, based on the information on the connection destination (parent) and the connection destination (child) of each record stored in the machine information database, the system configuration information generation unit 613 searches for at least one industrial machine connected to the industrial machine having the serial number included in the industrial machine system identification information directly or through another industrial machine, and generates a list including information on the retrieved industrial machine as the configuration information on the industrial machine system. Note that, the above-mentioned list may be set as a list including the industrial machine designated by the industrial machine system identification information and the retrieved industrial machine. Then, based on the information on the connection destination of the industrial machine included in the above-mentioned generated list, the system configuration information generation unit 613 may generate a wiring diagram of the industrial machine system, and provide the generated wiring diagram. Note that, processing for generating the configuration information on the industrial machine system is described later in detail.

The system configuration information providing unit 614 provides the configuration information on the industrial machine system generated by the system configuration information generation unit 613 to a source of the request for the viewing of the configuration information on the industrial machine system through the data communication unit 604.

[Processing Executed in the Industrial Machine Management System S]

Next, an example of processing executed in the industrial machine management system S is described with reference to FIG. 5 to FIG. 12. Further, in the processing executed in the industrial machine management system S, processing executed by the maintenance-use portable terminal 30 may be executed by the CPU 30*a* of the maintenance-use portable terminal 30 based on a program stored in the storage unit 30*b*, and processing executed by the cloud server 60 may be executed by the CPU 60*a* of the cloud server 60 based on a program stored in the storage unit 60*b*. Note that, the respective functional blocks provided to the industrial machine management system S are implemented by executing processing described below.

[Processing for Displaying Detailed Information on Industrial Machine]

First, FIG. 5 illustrates a sequence diagram of processing in which detailed information on an industrial machine is acquired from the cloud server 60 by the user by using the maintenance-use portable terminal 30 and the maintenance-use portable terminal 30 displays the detailed information.

As illustrated in FIG. 5, when receiving authentication information (user ID and password) from the user through the operating unit 30*e* (S101), the maintenance-use portable terminal 30 transmits the received authentication information to the cloud server 60 by the communication unit 30*c* (S102).

When receiving the authentication information the maintenance-use portable terminal 30 from through the communication unit 30*c*, the cloud server 60 executes user authentication based on the received authentication information (S103). When the above-mentioned authentication fails (N in S103), the cloud server 60 notifies the maintenance-use portable terminal 30 of an error (S104), and brings the processing to an end. When the above-mentioned authentication is successful (Y in S103), the cloud server 60 notifies the maintenance-use portable terminal 30 of successful authentication (S105), and permits a processing request to be received from the maintenance-use portable terminal 30.

After receiving the notification of the successful authentication from the cloud server 60, the maintenance-use portable terminal 30 acquires the serial number of the industrial machine whose detailed information is to be viewed (hereinafter referred to as "target machine") based on the user's input through the operating unit 30*e* or the code image picked up by the camera 30*f* (S106). The maintenance-use portable terminal 30 transmits the above-mentioned acquired serial number to the cloud server 60 (S107), and requests the detailed information on the industrial machine corresponding to the serial number.

The cloud server 60 searches the machine information database (database including both the first machine information database and the second machine information database) stored in the machine information storage unit 602 for the record that stores the above-mentioned received serial number in the serial number field, with the serial number received from the maintenance-use portable terminal 30 as a key. The cloud server 60 acquires the information stored in the above-mentioned retrieved record as machine information linked to the above-mentioned received serial number (S108). Note that, the cloud server 60 may cause the machine information to include all pieces of information included in the above-mentioned retrieved record, or may extract a part of the information stored in the above-mentioned retrieved record so as to be included in the machine information.

Subsequently, the cloud server 60 transmits the machine information on the target machine acquired in Step S108 to the maintenance-use portable terminal 30 (S109).

The maintenance-use portable terminal 30 receives the machine information on the target machine from the cloud server 60. Then, the maintenance-use portable terminal 30 displays a machine information display screen for displaying the above-mentioned received machine information (refer to, for example, FIG. 9) on the display unit 30*d* (S110). Now, an example of the machine information display screen is described.

FIG. 9 illustrates an example of a machine information display screen 510 displayed on the display unit 30*d* of the maintenance-use portable terminal 30 in Step S110. As illustrated in FIG. 9, the machine information display screen 510 includes a serial number display area 511, a maker management information display area 512, a user management information display area 513, an edit button 514, and a display button 515. The serial number display area 511 is an area for displaying the serial number of the target machine. The maker management information display area 512 is an area for displaying the maker management information stored in the maker area within the management information on the target machine. The user management information display area 513 is an area for displaying the user management information stored in the user area within the management information on the target machine. The edit button 514 is a button for editing the item of the user management information and the data on the item. The display button 515 is a button for displaying the system (device) configuration information including the target machine. Note that, when the machine information on the target machine does not include the maker area, the maker management information display area 512 may be omitted.

Next, processing for registering the user management information executed when the edit button 514 is pressed on the machine information display screen 510 illustrated in FIG. 9 is described with reference to FIG. 6.

[Processing for Registering User Management Information on Industrial Machine]

Figure 6:
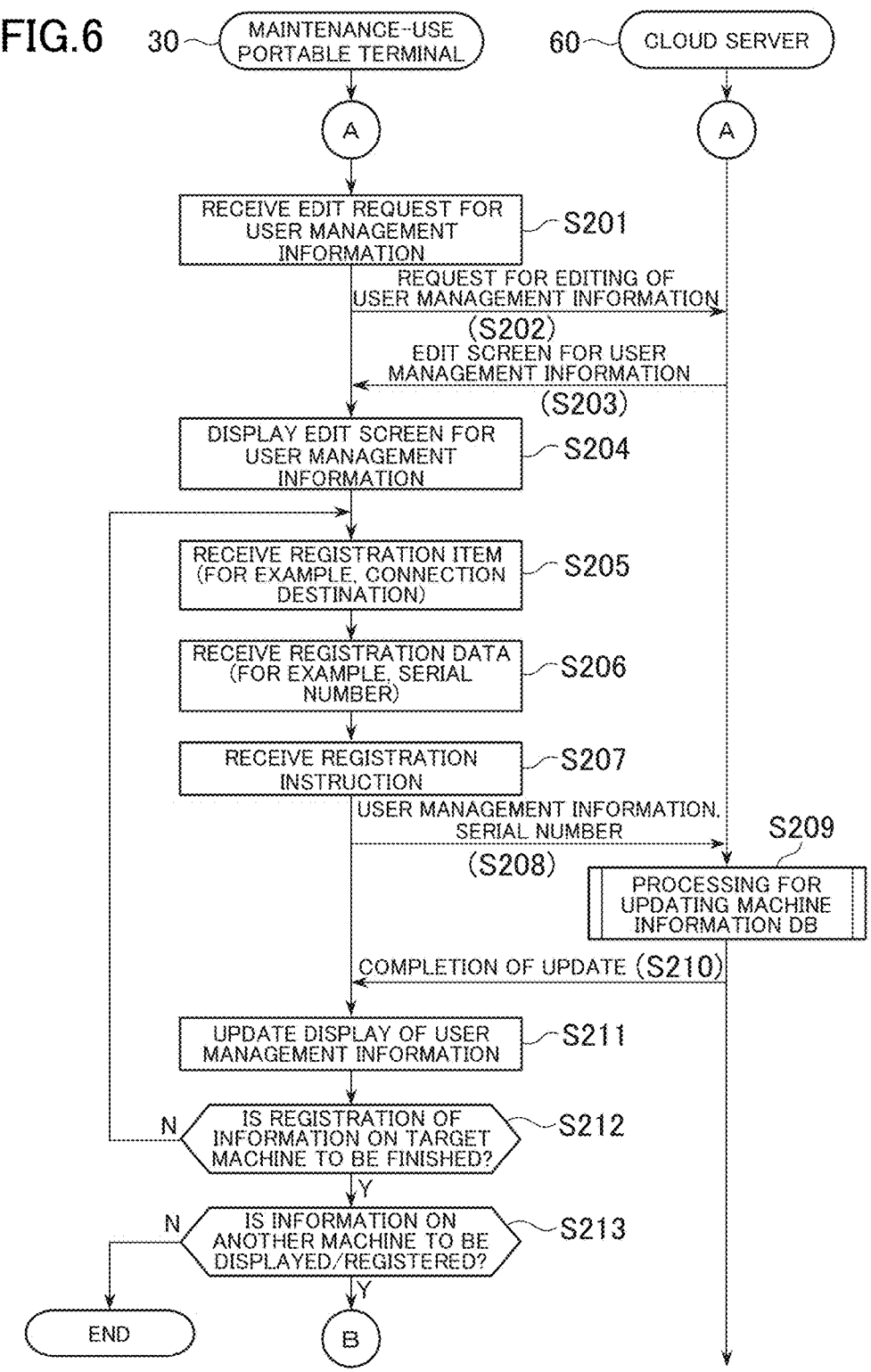
FIG. 6 is a sequence diagram illustrating an example of processing for registering user management information on an industrial machine.

FIG. 6 illustrates a sequence diagram of processing for registering the user management information on the target machine.

As illustrated in FIG. 6, the maintenance-use portable terminal 30 receives an edit request for the user management information on the target machine by, for example, detecting that the edit button 514 has been pressed on the machine information display screen 510 (S201). Then, the maintenance-use portable terminal 30 notifies the cloud server 60 of the serial number of the target machine, and requests editing of the user management information on the target machine (S202).

The cloud server 60 receives the edit request for the user management information on the target machine from the maintenance-use portable terminal 30. Then, the cloud server 60 transmits display data for displaying an edit screen for the user management information linked to the serial number relating to the edit request, to the maintenance-use portable terminal 30 (S203).

Based on the display data received from the cloud server 60, the maintenance-use portable terminal 30 displays an edit screen for editing the user management information (hereinafter referred to as "user management information edit screen", refer to FIG. 10) on the target machine on the display unit 30d (S204). Now, an example of the user management information edit screen is described.

Figure 10:
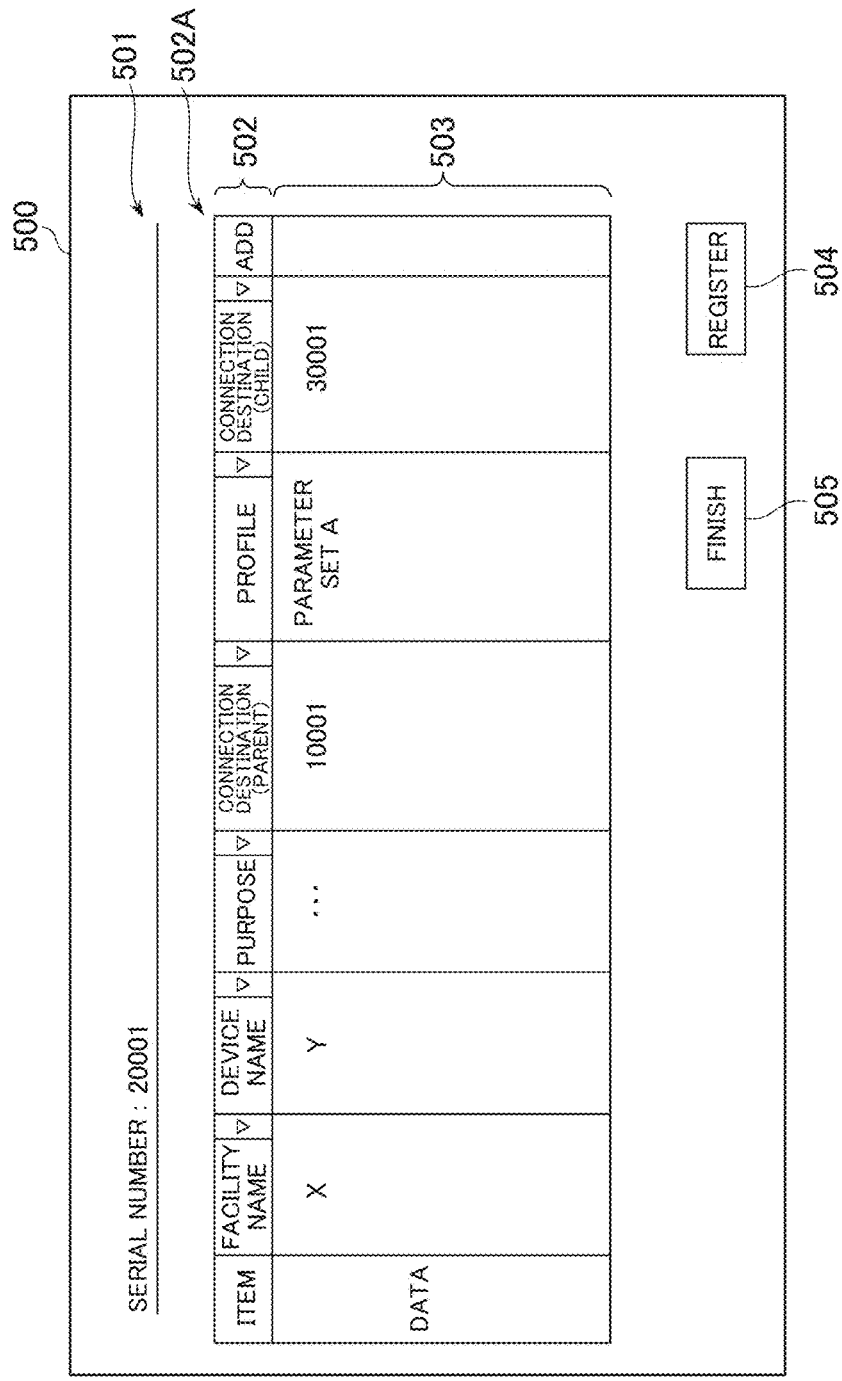
FIG. 10 is a diagram illustrating an example of a registration screen for registering the user management information on an industrial machine.

FIG. 10 illustrates an example of a user management information edit screen 500 displayed on the display unit 30d of the maintenance-use portable terminal 30 in Step S204. As illustrated in FIG. 10, the user management information edit screen 500 includes a serial number display area 501, an item setting area 502, a data setting area 503, a registration button 504, and a finish button 505. The serial number display area 501 is an area for displaying the serial number of the target machine. The item setting area 502 is an area for setting the item of the user management information. The data setting area 503 is an area for setting data to be stored in each of the set items. Further, an item can be added by pressing an add button 502A in the item setting area 502. Further, the content of the item may be set by being selected from a list of preset items, or may be set by the user inputting an arbitrary content.

The maintenance-use portable terminal 30 receives the setting of an item to be registered (registration item) through the user management information edit screen 500 (S205). In addition, the maintenance-use portable terminal 30 receives data to be set for the registration item (registration data) through the user management information edit screen 500 (S206). For example, the maintenance-use portable terminal 30 may receive the "connection destination (parent)" as the registration item, and the serial number serving as the individual identification information on the industrial machine serving as the connection destination (parent) as the registration data. Then, the maintenance-use portable terminal 30 receives a registration instruction from the user when the registration button 504 is pressed on the user management information edit screen 500 (S207). Then, the maintenance-use portable terminal 30 transmits the user management information including the item set on the user management information edit screen 500 and the data on the item to the cloud server 60 along with the serial number of the target machine (S208), and requests the updating of the user management information on the target machine.

The cloud server 60 receives the user management information and the serial number from the maintenance-use portable terminal 30. Then, the cloud server 60 executes processing for updating the machine information database based on the above-mentioned received data (S209). The processing for updating the machine information database is described in detail with reference to a flowchart illustrated in FIG. 7.

[Processing for Updating the Machine Information Database]

Figure 7:
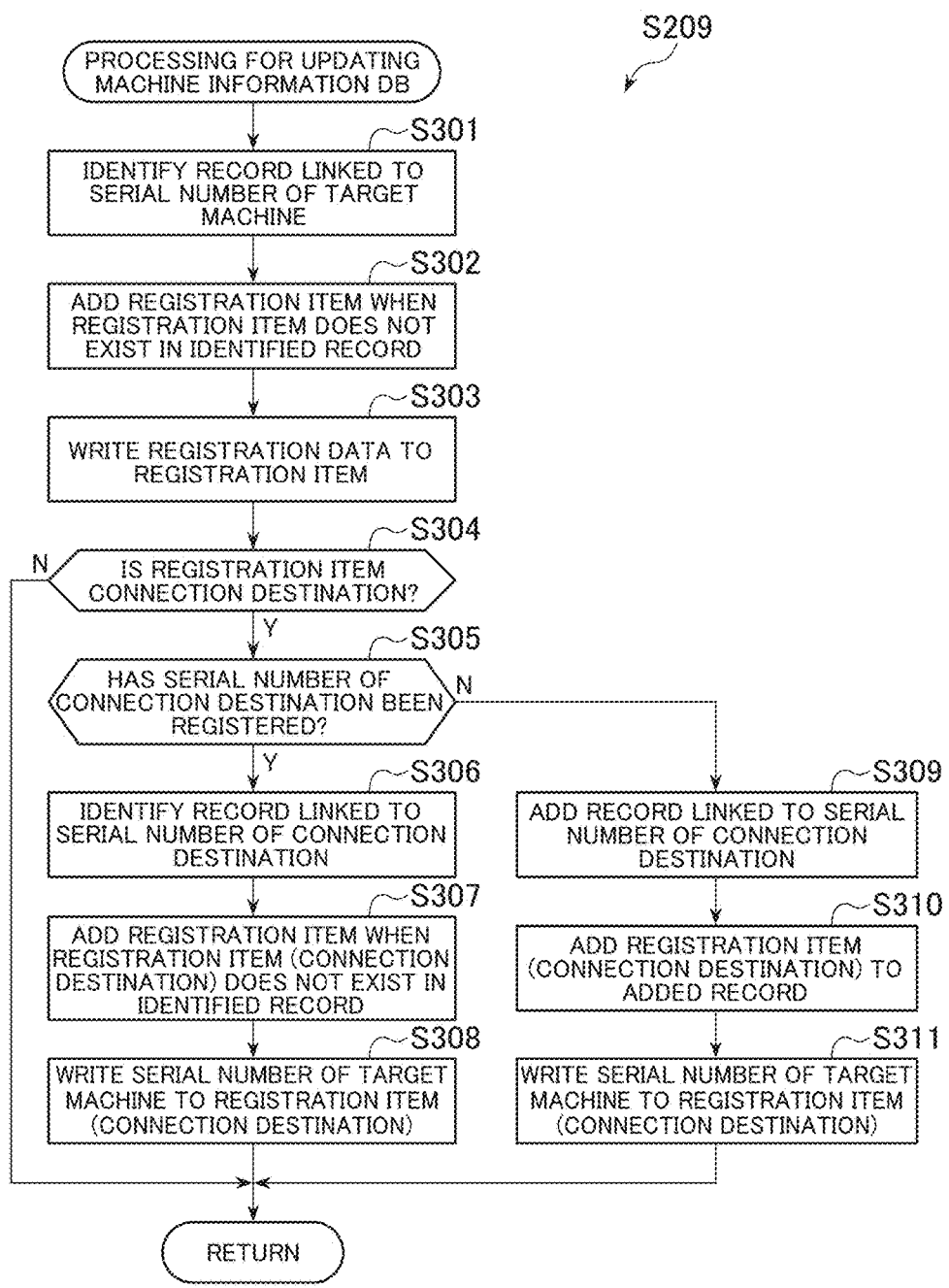
FIG. 7 is a sequence diagram illustrating an example of processing for updating the machine information database.

As illustrated in FIG. 7, the cloud server 60 identifies the record linked to the serial number of the target machine from the machine information database with the serial number of the target machine received from the maintenance-use portable terminal 30 as a key (S301).

When the user area of the record identified in Step S301 does not include the registration item included in the user management information received from the maintenance-use portable terminal 30, the cloud server 60 adds the registration item (S302). The cloud server 60 writes the registration item and the registration data included in the user management information into the user area of the record identified in Step S301 in association with each other (S303).

Subsequently, when the registration item written into the user area of the record is not the connection destination (at least one of connection destination (parent) or connection destination (child)) (N in S304), the cloud server 60 finishes the processing for updating the machine information database. When the registration item written into the user area of the record is the connection destination (Y in S304), the cloud server 60 determines whether or not the serial number newly stored for the item of the connection destination has already been registered in the serial number field of the machine information database (S305).

When it is determined in Step S305 that the serial number (serial number of the connection destination) newly stored for the item of the connection destination has already been registered in the serial number field of the machine information database (Y in S305), the cloud server 60 identifies the record linked to the serial number of the connection destination from the machine information database (S306). When the above-mentioned identified record does not include the registration item, the cloud server 60 adds the registration item (S307), writes the serial number of the target machine into the registration item (S308), and finishes the processing for updating the machine information database. Note that, the above-mentioned registration item may be set as the connection destination (child) when the item registered for the target machine is the connection destination (parent), and may be set as the connection destination (parent) when the item registered for the target machine is the connection destination (child).

On the other hand, when it is determined in Step S305 that the serial number (serial number of the connection destination) newly stored for the item of the connection destination has not been registered yet in the serial number field of the machine information database (N in S305), the cloud server 60 adds the record to the second machine information database (S309). The cloud server 60 adds the registration item to the added record (S310), writes the serial number of the target machine into the registration item (S311), and finishes the processing for updating the machine information database. The above-mentioned registration item may be set as the connection destination (child) when the item registered for the target machine is the connection destination (parent), and may be set as the connection destination (parent) when the item registered for the target machine is the connection destination (child).

Now, description is continued by returning to the sequence diagram of FIG. 6. When finishing the processing for updating the machine information database based on the user management information received from the maintenance-use portable terminal 30 (S209), the cloud server 60 notifies the maintenance-use portable terminal 30 of completion of the update (S210).

When receiving the notification of the completion of the update from the cloud server 60, the maintenance-use portable terminal 30 updates the display of at least one of the user management information edit screen 500 or the machine information display screen 510 on the target machine (S211). When registration of information on the target machine is not to be finished (N in S212), the maintenance-use portable terminal 30 returns to Step S205. In a case where the registration of information on the target machine is to be finished (for example, the finish button 505 is pressed on the user management information edit screen 500) (Y in S212), when the information on another machine is to be further displayed/registered (Y in S213), the maintenance-use portable terminal 30 returns to Step S106 of FIG. 5 to repeat the subsequent processing. Further, when the information on another machine is not to be displayed/registered (N in S213), the maintenance-use portable terminal 30 brings the processing to an end.

The processing for displaying the management information (including maker management information and user management information) on the target machine designated by the user by using the maintenance-use portable terminal 30 and the processing for updating the user management information on the target machine have been described above.

[Processing for Providing Configuration Information on the Industrial Machine System]

Next, an example of processing for generating/providing the configuration information on the industrial machine system (device) including the target machine is described with reference to a flowchart illustrated in FIG. 8. Note that, the processing of FIG. 8 may be executed when the display button 515 for displaying the system configuration information on the machine information display screen 510 illustrated in FIG. 9 is pressed.

Figure 8:
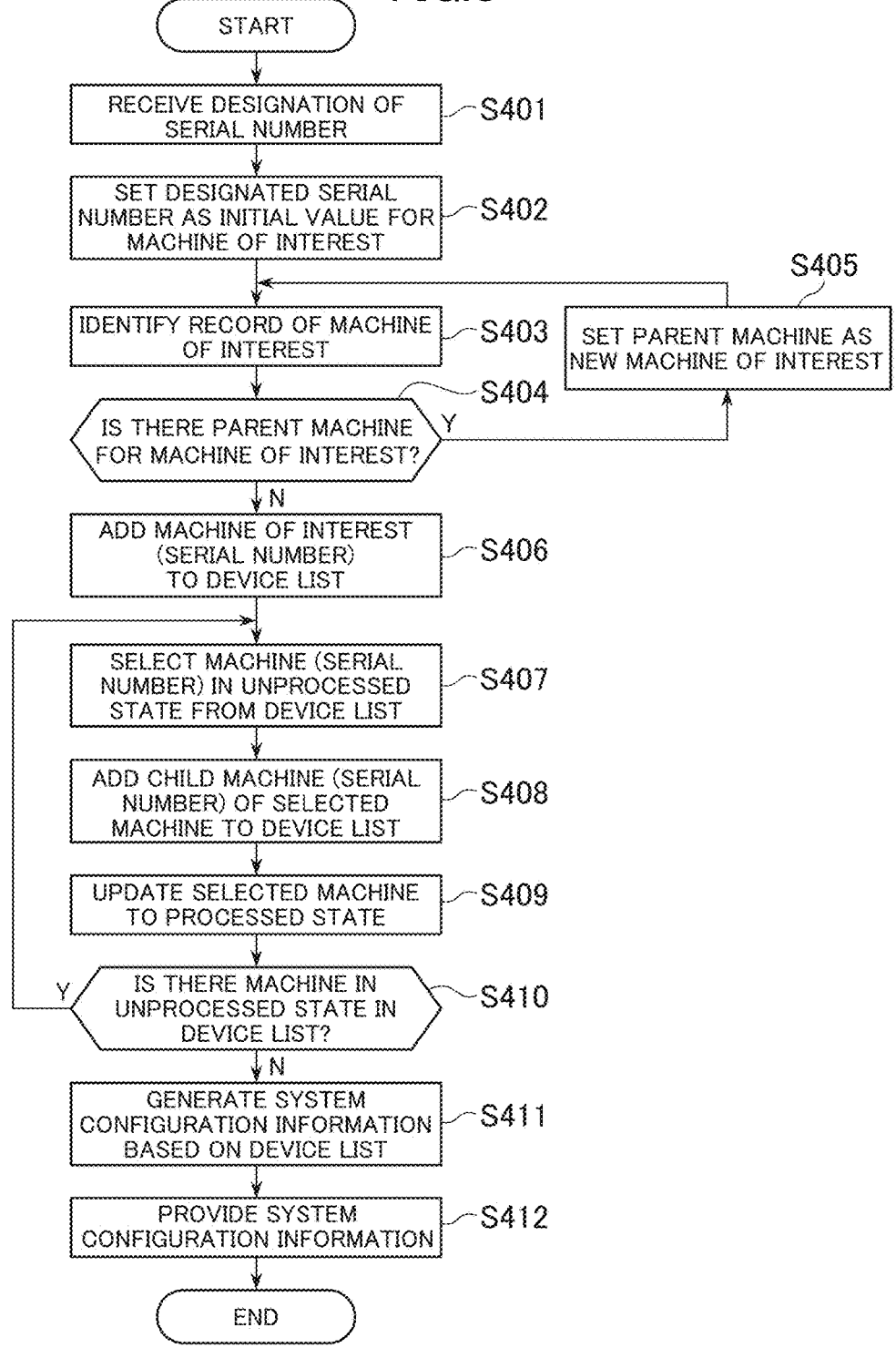
FIG. 8 is a sequence diagram illustrating an example of processing for providing configuration information on an industrial machine system to the user.

As illustrated in FIG. 8, the cloud server 60 receives designation of the serial number of an industrial machine that forms a device from the terminal such as the maintenance-use portable terminal 30 (S401). The cloud server 60 sets the above-mentioned serial number whose designation has been received as an initial value for a machine of interest (S402).

Subsequently, the cloud server 60 identifies the record of the machine of interest from the machine information database with the serial number of the machine of interest as a key (S403). Here, the cloud server 60 determines whether or not the industrial machine serving as the connection destination (parent) exists for the machine of interest based on the user management information of the record identified in Step S403 (S404). For example, the cloud server 60 may determine that the industrial machine serving as the connection destination (parent) exists when the serial number is stored in a data area of the item of the connection destination (parent) within the user management information of the record identified for the machine of interest. Further, the cloud server 60 may determine that the industrial machine serving as the connection destination (parent) does not exist when the item of the connection destination (parent) does not exist or when the serial number is not stored in the data area of the item of the connection destination (parent).

When determining in Step S404 that the industrial machine serving as the connection destination (parent) connected to the machine of interest exists (Y in S404), the cloud server 60 sets the stored serial number as a new machine of interest (S405), and returns to Step S403. Further, when the serial number is stored for the item of the connection destination (parent) within the user management information of the record identified for the machine of interest, the cloud server 60 may determine the industrial machine serving as the connection destination (parent) connected to the machine of interest exists.

On the other hand, when determining in Step S404 that the industrial machine serving as the connection destination (parent) does not exist for the machine of interest (N in S404), the cloud server 60 determines that the machine of interest is a top-level machine in the industrial machine system, and adds the serial number of the machine of interest to a device list (S406). Further, when the item of the connection destination (parent) does not exist in the user management information of the record identified for the machine of interest or when the serial number is not stored in the data area of the item of the connection destination (parent), the cloud server 60 may determine that the industrial machine serving as the connection destination (parent) does not exist for the machine of interest. Note that, the cloud server 60 may store a processing completion flag (true-false value indicating a processed state by true and an unprocessed state by false) in association with each serial number to be added to the device list, and in this case, the processing completion flag is set to have an initial value of the unprocessed state (false).

Subsequently, the cloud server 60 selects the serial number in an unprocessed state from among the serial numbers (industrial machines) included in the device list (S407). The cloud server 60 adds, to the device list, the serial number stored for the item of the connection destination (child) within the user management information of the record identified from the machine information database with the above-mentioned selected serial number as a key (S408). Then, the cloud server 60 updates the processing completion flag for the serial number selected in Step S407 to the processed state (true) (S409).

When the serial number (industrial machine) in an unprocessed state exists in the device list after Step S409 (Y in S410), the cloud server 60 returns to Step S407 to repeat the subsequent processing. When the serial number (industrial machine) in an unprocessed state does not exist in the device list (N in S410), the cloud server 60 generates the system configuration information based on the serial number included in the device list and the management information stored in the machine information database in association with each serial number (S411). For example, the system configuration information may include the information such as the serial number, the product name, the model, the facility name, the device name, the connection destination (parent), and the connection destination (child) for each of the plurality of industrial machines that form the industrial machine system.

Then, the cloud server 60 provides (transmits) the system configuration information generated in Step S411 to the terminal from which the processing request has been received (for example, maintenance-use portable terminal 30) (S412), and brings the processing to an end. Note that, the terminal that has received the system configuration information from the cloud server 60 may display the system configuration information.

Here, FIG. 11 illustrates an example of a display screen based on the system configuration information provided from the cloud server 60 (hereinafter referred to as "system configuration information display screen"). As illustrated in FIG. 11, a system configuration information display screen 520 includes a system configuration display area 521 and a button 522. The system configuration display area 521 is an area for displaying the information such as the serial number, the product name, the model, the facility name, the device name, the connection destination (parent), and the connection destination (child) for the plurality of industrial machines that form the industrial machine system. The button 522 is a button for displaying the wiring diagram based on the information displayed in the system configuration display area 521.

Figure 12:
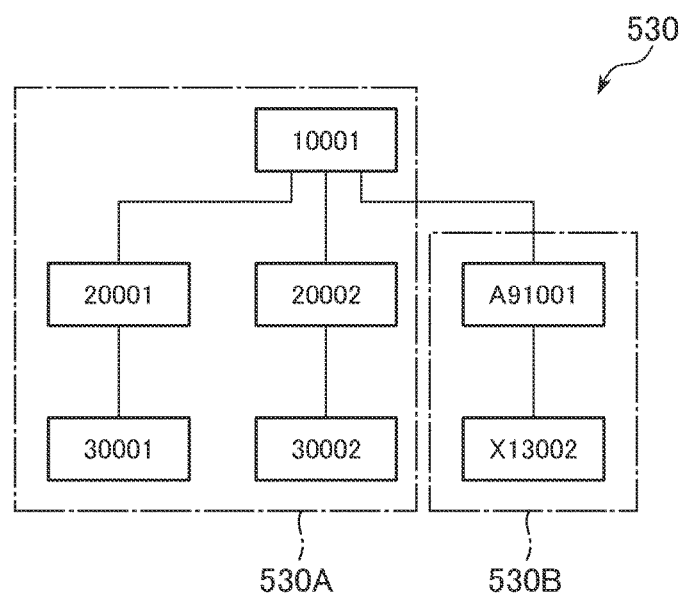
FIG. 12 is a diagram illustrating an example of a wiring diagram of the industrial machine system.

For example, when the button 522 is pressed on the system configuration information display screen 520, the terminal requests the cloud server 60 to generate the wiring diagram, and the cloud server 60 generates data on the wiring diagram illustrated in, for example, FIG. 12 based on a connection relation identified by the connection destination (parent) and the connection destination (child) of the system configuration information. Then, the cloud server 60 may provide the above-mentioned generated data on the wiring diagram to the terminal.

Note that, the wiring diagram illustrated in FIG. 12 is formed by connecting the respective industrial machines to each other based on the connection relation while arranging the industrial machine serving as the connection destination (parent) at the top and the corresponding child industrial machines at the bottom. In the wiring diagram of FIG. 12, the respective industrial machines correspond to blocks in each of which a serial number is described. Here, FIG. 12 illustrates a wiring diagram of an industrial machine 530, along with an industrial machine group 530A stored in the first machine information database (that is, group of industrial machines managed by the production management server 80). Further, FIG. 12 illustrates an industrial machine group 530B stored in the second machine information database (that is, group of industrial machines that are not managed by the production management server 80). In this manner, even when industrial machines made by a plurality of makers coexist in the user's environment, it is possible to display the configurations of all the industrial machines included in the user's device.

According to the industrial machine management system S described above, the user management information set by the user for each piece of individual identification information on the industrial machine is stored in the cloud server 60 in association, to thereby allow the cloud server 60 to collectively manage the user management information set for each industrial machine. This facilitates the sharing of the user management information according to the industrial machine management system S.

Further, the maker area serving as the storage area for writing the management information set by the maker for each piece of individual identification information on the industrial machine and the user area serving as the storage area for writing the management information set by the user are provided, which allows the maker area to hold the management information that does not depend on the user's environment for the individual industrial machine. Further, the information stored in the maker area is inhibited from being changed by the user, which can guarantee property and invariance of the information within the maker area.

Further, the cloud server 60 provides the management information stored in the machine information database for the individual identification information on the industrial machine designated by the user, which allows the user to view the management information on the designated industrial machine.

Further, in the user management information, data on at least one of at least one item designated by the user or at least one item designated in advance is stored in association with each of the individual industrial machines, which allows the setting of the user management information having contents corresponding to the user's environment in which the individual industrial machine is placed.

Further, in the user management information, the identification information on another industrial machine serving as the connection destination connected through a wiring (including, for example, electric wire or signal line) is stored in association with each of the individual industrial machines, which allows the connection relation between the individual industrial machines in the user's environment to be managed based on the user management information on the individual industrial machines.

Further, when the user management information in which the industrial machine serving as the connection destination of the industrial machine to be registered is designated is received from the terminal operated by the user, in a case where the individual identification information on the industrial machine of the designated connection destination has already been registered in the machine information database, the cloud server 60 can write the individual identification information on the industrial machine to be registered, as the connection destination, into the user management information managed by the machine information database for the individual identification information on the industrial machine of the designated connection destination. This allows the connection relation to be associated with both the industrial machines that are in a connection relation.

Further, when the user management information in which the industrial machine serving as the connection destination of the industrial machine to be registered is designated is received from the terminal operated by the user, in a case where the individual identification information on the industrial machine of the designated connection destination is not registered in the machine information database, the cloud server 60 newly adds the record for the individual identification information on the industrial machine of the designated connection destination to the machine information database, to thereby be able to manage the information even when the industrial machine is not registered in the machine information database. Further, the individual identification information on the industrial machine to be registered is added, as the connection destination, to the individual identification information on the user management information managed by the machine information database for the newly added industrial machine, which allows the connection relation to be associated with both the industrial machines that are in a connection relation. Further, the user management information set by the user can be managed by the cloud server 60 also for the newly added industrial machine.

Further, the cloud server 60 can generate the configuration of a device formed of a plurality of industrial machines including the industrial machine designated by the user, based on the information on the industrial machine identified after a search based on the information on the connection destination stored in the machine information database for the designated industrial machine, and can provide the user therewith. In addition, the cloud server 60 can also generate the wiring diagram of the device formed of the plurality of industrial machines, based on the information on the connection destinations of the plurality of industrial machines included in the device, and can provide the user therewith.

[Modification Example]

Note that, the present invention is not limited to the above-mentioned embodiment. For example, the above-mentioned embodiment is described by taking the example in which the user terminal for acquiring and registering the data to be stored in the machine information database is the maintenance-use portable terminal 30, but the motor control device maintenance terminal 20, another personal computer, or the like may be used as the user terminal. For example, when the motor control device maintenance terminal is used as the user terminal, the motor control device maintenance terminal may acquire a parameter file storing parameter information from the motor control device to be controlled. Then, the motor control device maintenance terminal may register the above-mentioned acquired parameter file in the cloud server 60 in association with the individual identification information on the motor control device to be controlled. Here, for example, when the industrial machine to be managed is a motor, the parameter file may store (1) a kind (for example, rotary type or linear type) of the motor 1, (2) model information (for example, model number) of the motor 1, and (3) the parameter information relating to the motor 1. Note that, the parameter information may store parameter information corresponding to the kind of the motor 1. For example, in the case of the rotary type, the parameter information may store a rated torque, a rated power, a rated rotational speed, an instantaneous maximum torque, a motor inertia moment, a pole number, a highest rotational speed, a rated current, a maximum current, and d-axis and q-axis inductances. In the case of the linear type, the parameter information may store a maximum thrust, a rated thrust, a moving coil mass, a rated speed, a highest speed, a pole pitch, a rated current, a maximum current, and d-axis and q-axis inductances.

Further, the above-mentioned embodiment is described by taking the example in which the information on the industrial machine (for example, product made by a predetermined maker) managed by the production management server 80 is managed by the first machine information database while the information on the other industrial machines is managed by the second machine information database, but the information on all the industrial machines may be managed by the first machine information database. In the case, for the industrial machine managed by the second machine information database in the above-mentioned embodiment, the maker area may be blank, and all pieces of management information may be stored in the user area.

Further, the above-mentioned embodiment is described by taking the example in which another industrial machine that forms the industrial machine system including the designated industrial machine is determined based on the serial number of an industrial machine serving as the connection destination included in the user management information on the industrial machine, but a plurality of industrial machines (industrial machine group) that form the industrial machine system may be extracted based on conditions such as a designated device name.

Further, when various kinds of data are transmitted/received between the industrial machine (for example, controller 40) connectable to the network N and each server (for example, cloud server 60), different kinds of communications protocol can be employed, and a file transfer protocol (FTP) may be used as an example thereof.

For example, a function of a FTP client may be implemented on an industrial machine, and a function of a FTP server may be implemented on a server. In this case, the above-mentioned server functioning as the FTP server stands by for a communication connection request based on the FTP from the industrial machine functioning as the FTP client. When the industrial machine performs the communication connection request to the server, the industrial machine can transfer data and a program (for example, setting information on the industrial machine, firmware, and logging data in which an operational situation and the like of the industrial machine are recorded) stored in its own storage unit to the server as a file to be transferred, and record the file in a storage unit on a server side. In addition, the industrial machine can acquire data and a program (for example, setting information on the industrial machine or another industrial machine and firmware) stored in the storage unit on the server side as a file to be transferred, and record the file in its own storage unit. With this configuration, the industrial machine can perform the data transfer between its own storage unit and the storage unit on the server side at an arbitrary timing.

Further, in contrast to the above-mentioned configuration, the function of the FTP server may be implemented on the industrial machine, and the function of the FTP client may be implemented on the server. In this case, the industrial machine functioning as the FTP server stands by for the communication connection request based on the FTP from the server functioning as the FTP client. When the server performs the communication connection request to the industrial machine, the server can transfer data and a program (for example, setting information on the industrial machine or another industrial machine and firmware) stored in the storage unit on the server side to the industrial machine as a file to be transferred, and record the file in the storage unit of the industrial machine. In addition, the server can acquire data and a program (for example, setting information on the industrial machine, firmware, and logging data) stored in the storage unit of the industrial machine as a file to be transferred, and record the file in its own storage unit. With this configuration, the server can perform the data transfer between the storage unit on the server side and the storage unit of the industrial machine at an arbitrary timing.

Note that, when the file transmitted/received in the above-mentioned manner is data stored in the user area of the machine information, the data registered in the user area by each user can be acquired from the server by the industrial machine, and can be transferred from the server to the industrial machine, at an arbitrary timing.

It should be understood by those skilled in the art that various modifications, combinations, sub-combinations and alterations may occur depending on design requirements and other factors insofar as they are within the scope of the appended claims or the equivalents thereof.

What is claimed is:

1. An industrial machine management system comprising:
a first terminal;
a second terminal; and
an industrial machine management device, wherein
the first terminal comprises a transmitter that transmits user management information for a first industrial machine which is one of a plurality of industrial machines;

the second terminal downloads firmware selected by a user from the industrial machine management device and updates an installed firmware in a storage of the first industrial machine with the firmware which is downloaded; and the industrial machine management device comprises:
  a receiver configured to receive the serial number and the user management information from the transmitter; and
  a storage that comprises a machine information database for the plurality of the industrial machines;
  a register that creates a new record which includes the serial number and the manufacture management information of the first industrial machine in the machine information database when the first industrial machine, whose order has been place by the user, is produced;
  a write that searches the machine information database for the record corresponding with the serial number received from the first terminal as a key, and writes the user management information which is received into the searched record;
  wherein the manufacturer management information includes kind or version information on the firmware installed onto the storage of the first industrial machine;
  wherein the manufacturer management information cannot be written to by the terminal and is inhibited from being changed by the user;
  wherein the firmware installed onto the storage of the first industrial machine controls the operation of the first industrial machine;
  wherein the kind or version information on the firmware installed onto the storage of the first industrial machine within the manufacturer management information is changed in response to updating the firmware installed onto the storage of the first industrial machine; and
  wherein the second terminal displays the kind or version information on the firmware installed onto each of the plurality of the industrial machines on the display unit.

2. The industrial machine management system according to claim 1, wherein the industrial machine management device further comprises:
  a provider that provides at least one of the user management information and manufacturer management information.

3. The industrial machine management system according to claim 1, wherein the user management information comprises:
  a first item; and
  data relating to the first item.

4. The industrial machine management system according to claim 3, wherein the user management information comprises:
  the first item indicating the first industrial machine serving as a connection destination of an industrial machine to be managed; and
  individual identification information on the first industrial machine serving as the connection destination.

5. The industrial machine management system according to claim 4, wherein the industrial machine management device further comprises:
  an adding unit that adds a storage area for storing information to be associated with the individual identification information on the industrial machine serving as the connection destination, to the storage, when the storage does not store the individual identification information on the industrial machine serving as the connection destination.

6. The industrial machine management system according to claim 5, wherein the industrial machine management device further comprises a writer that writes the individual identification information on the first industrial machine to be managed into the storage area added by the adding unit.

7. The industrial machine management system according to claim 5, wherein:
  the industrial machine management device further comprises:
  an information acquirer that acquires the management information for the user, which is set in accordance with the input from the user in regard to the individual identification information on the industrial machine serving as the connection destination; and
  a writer that writes the acquired management information for the user into the storage area associated with the individual identification information on the industrial machine serving as the connection destination.

8. The industrial machine management system according to claim 4, wherein the industrial machine management device further comprises:
  a generator that generates, based on the individual identification information on the industrial machine serving as the connection destination stored in the storage in association with the individual identification information on a designated industrial machine, information on an industrial machine group formed of a plurality of industrial machines connected to the designated industrial machine directly or through another industrial machine; and
  an industrial machine group information provider that provides the information on the industrial machine group generated by the generator.

9. An industrial machine management method performed by a first terminal, a second terminal, and an industrial machine management device, the industrial machine management method comprising:
  transmitting a serial number and user management information for a first industrial machine which is one of a plurality of industrial machines by the first terminal;
  downloading firmware selected by a user from the industrial machine management device and updating an installed firmware in a storage of the first industrial machine with the firmware which is downloaded;
  receiving the serial number and the user management information for the first industrial machine from the first terminal by the industrial machine management device;
  storing a machine information database for the plurality of the industrial machines by the industrial machine management device; and
  creating a new record which includes the serial number and the manufacture management information of the first industrial machine in the machine information database by the industrial machine management device when the first industrial machine, whose order has been placed by the user, is produced;
  searching the machine information database for the record corresponding with the serial number received from the first terminal as a key, and writing the user management information which is received into the searched record by the industrial machine management device: and
  displaying the kind or version information on the firmware installed onto each of the plurality of the industrial machines on the display unit by the second terminal, and wherein the manufacturer management information includes kind or version information on the firmware installed onto the storage of the first industrial machine;

wherein the manufacturer management information cannot be written to by the terminal and is inhibited from being changed by the user;

wherein the firmware installed onto the storage of the first industrial machine controls the operation of the first industrial machine; and wherein the kind or version information on the firmware installed onto the storage of the first industrial machine within the manufacturer management information is changed in response to updating the firmware installed onto the storage of the first industrial machine.

* * * * *